United States Patent Office 3,395,927
Patented Aug. 6, 1968

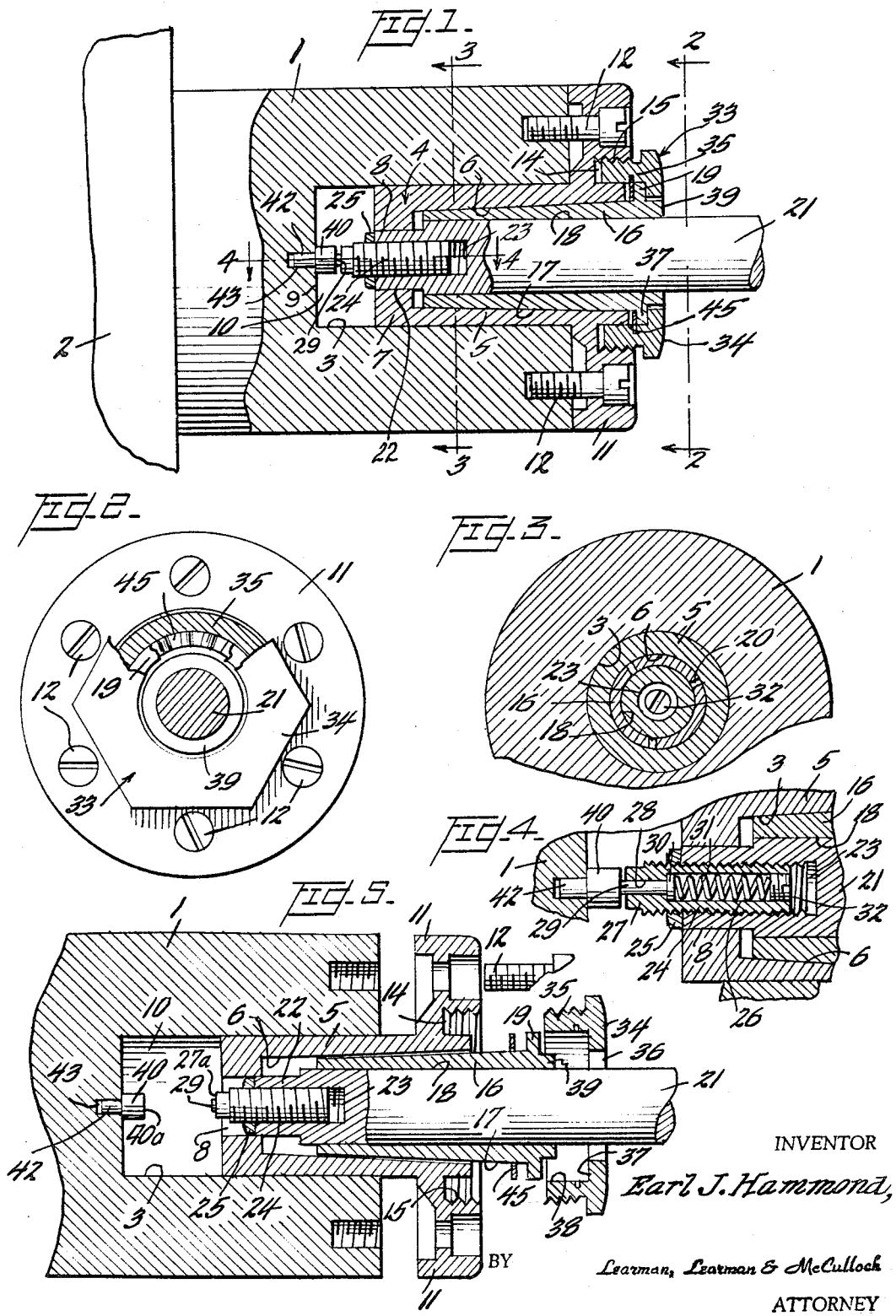

3,395,927
TOOL HOLDER AND TOOL ASSEMBLY
Earl J. Hammond, Frankenmuth, Mich., assignor, by mesne assignments, to Houdaille Industries, Inc., Buffalo, N.Y., a corporation of Michigan
Filed Apr. 19, 1965, Ser. No. 449,124
6 Claims. (Cl. 279—51)

ABSTRACT OF THE DISCLOSURE

A holder assembly for tools and workpieces wherein a shank is to be held by a tapered collet mounted in a holder for axial movement to radially clamp down on the shank when a clamping nut is actuated to axially move the collet; and wherein axially compressible shank positioning means is provided to resist axial inward movement of the shank when the shank is initially inserted a predetermined distance into the holder by the operator, and to positively limit axial inward movement of the shank when the collet means is clamped down and carries the shank axially inwardly with it a predetermined distance during the terminal portion of the clamp-down operation to compress the positioning means.

---

This invention relates particularly to a tool holder by which the shank of a work tool such as a drill, reamer, milling cutter or grinder is removably secured in a predetermined fixed position in the spindle of a machine tool by means of a tapered slotted collet which is disposed about the shank of the tool and is adapted to be forced into a complementary tapered axial bore provided in the outer end of a spindle.

In collet tool holder assemblies of this type, when the collet has been clamped down somewhat and grips the shank somewhat, it will move the shank axially with it during the terminal portion of the clamp-down operation. However, in most types of machining work the tool must be disposed in predetermined fixed positions with respect to the spindle and the work holder. Heretofore, when a tool was to be changed and the replacement tool inserted the collet was usually only tightened down on the replacement tool shank by the operator to the point that it would not move the tool and distrub the accuracy of the cut. Because the collet was not fully tightened down, the tool would frequently tend to "walk" out of the holder during the cutting operation.

It is therefore the principal object of the present invention to provide a new and improved holder by means of which a work engaging tool may be quickly and accurately securely clamped in the spindle of a machine tool.

Another object of the invention is to provide a holder of the aforesaid character which is of simple construction and can be readily incorporated in a machine tool spindle.

Still another of the objects of this invention is to provide in a tool holder of the aforesaid character means by which the shank of a work tool is initially positioned with respect to the tool holder as the shank is inserted into the tool holder collet and then is finally accurately positioned with respect to a spindle as the shank is gripped by and moved along with the collet.

Having stated the principal objects of the invention, other and more specific objects thereof will be apparent from the following specification and the accompanying drawings forming a part thereof in which:

FIGURE 1 is a central vertical section through the outer end of a machine tool spindle showing the tool holder of my invention incorporated therein;

FIGURE 2 is a transverse vertical section taken on the line 2—2 of FIGURE 1, with parts broken away for purposes of illustration;

FIGURE 3 is a transverse vertical section taken on the line 3—3 of FIGURE 1;

FIGURE 4 is an enlarged fragmentary section taken on the line 4—4 of FIGURE 1;

FIGURE 5 is a view similar to FIGURE 1 showing the various parts of the device in separated position.

Figure 6:
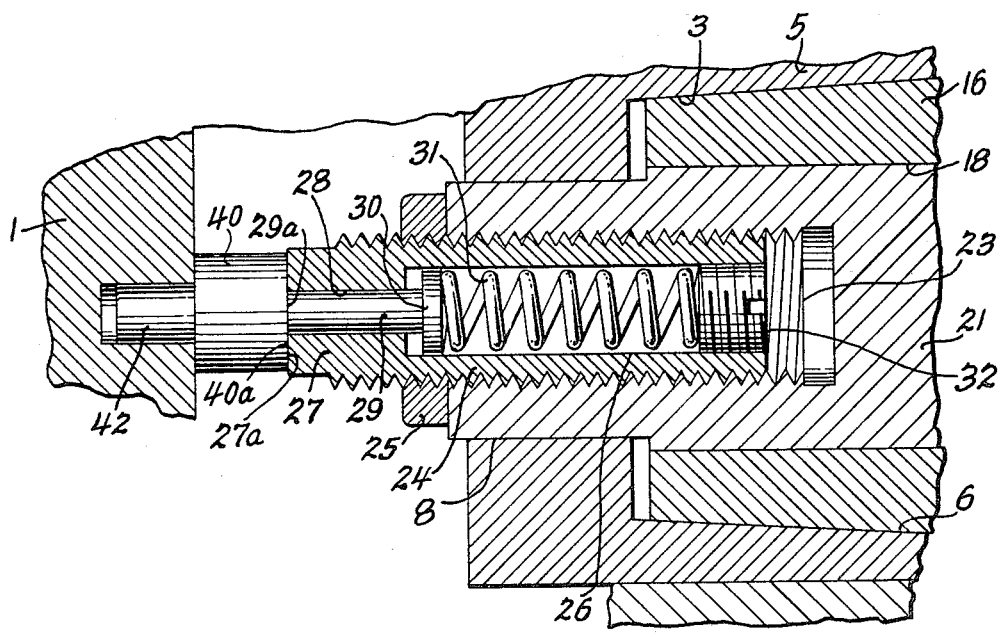
FIGURE 6 is a view similar to FIGURE 4 showing the shank in final position.

The device will now be specifically described in connection with the drawings with the use of reference characters in which the numeral 1 indicates the spindle of a conventional machine tool 2. The outer end portion of the spindle 1 is provided with an enlarged cylindrical axial bore or opening 3 and so constitutes a holder in which an adapter holder, generally indicated by the numeral 4, is removably secured. The adapter 4 need not be a separate member and could be an integral section of the outer end portion of the spindle 1 except that the device is easier to manufacture if the adapter 4 is a separate member. The outer end portion of spindle 1 with the bore 3 and the adapter 4 may be referred to as holder means. The adapter 4 comprises a cylindrical body 5 having an axial conical bore or opening 6 therein which converges inwardly from the outer end of the body 5 and is closed at the inner end thereof by an end wall 7 having an axial square aperture or opening 8 of reduced size relative to the diameter of the inner end of the conical bore 6. The end wall 7 of the adapter body 5 is spaced outwardly from the bottom wall 9 of the spindle bore 3, thereby providing a chamber 10 therebetween. The outer end of the adapter body 5 is provided with an annular flange 11 which is adapted to be removably secured to the outer end of the spindle 1 by a plurality of annularly spaced screws 12. An annular recess 14 is formed in the outer wall of the flange 11 and the outermost wall of the recess 14 is interiorly threaded as indicated at 15.

A collet 16 having an outer conical wall 17, complementary to the conical bore 6 in the adapter 4, is disposed within the adapter bore 6. The collet 16, which is provided with a cylindrical axial bore or opening 18, for the reception of the shank 21 of a work tool, and an annular collar 19 adjacent the outer end thereof, is slotted as indicated at 20 to permit contraction thereof as it is forced rearwardly into the bore 6.

The free end of the work tool shank 21, which is designed for use in connection with the present invention, is provided with an integral axially disposed square extension 22 having an internally threaded axial bore or opening 23 which extends therethrough and into the end of the shank 21. An externally threaded pin housing 24 is adjustably threaded into the bore 23 and is locked in adjusted position by a lock nut 25. The housing 24 is provided with a cylindrical bore 26 which is open at one end thereof and is closed at the other end thereof by a relatively thick end wall 27 having an aperture or opening 28 extending therethrough which is of lesser diameter than the bore 26 and is disposed in axial alignment therewith. An elongated pin 29, of greater length than the length of the aperture 28 and providing a position determining surface 29a (FIGURE 6) which is slidably mounted in the aperture 28, is provided with an enlarged circular disk-like head 30 which is slidably mounted in the bore 26 in the pin housing 24. A strong helical compression spring 31 is disposed within the bore 26 between the head 30 and a threaded plug 32 which is screwed into the open end of the bore 26 and maintains the spring 31 compressed. The spring 31 normally yieldingly maintains the pin head 30 in contact with the inner surface of the end wall 27, thereby projecting the free end of the pin 29 out beyond the outer surface 27a of the end wall 27 which provides a position determining surface.

The collet 16 is forced inwardly into the conical bore 6 of the adapter 4, and maintained therein, by a clamping nut, generally indicated by the numeral 33, which comprises a head 34 and an integral ring-shaped externally threaded body portion 35 which extends outwardly from the rear surface of the head 34 and is adapted to be screwed into the annular recess 14 in the flange 11 of the adapter 4. The head 34 is provided with an axially disposed circular aperture or opening 36 of lesser diameter than the inside diameter of the body portion 35 thereby providing an annular shoulder 37 between the inner wall 38 of the body portion 35 and the aperture 36 in the head 34 of the nut 33. As the body portion 35 of the nut 33 is screwed into the recess 14 the shoulder 37 engages the outer face of the collar 19 of the collet 16 with the outer end 39 of the collet 16 extending into the aperture 36 in the head 34 of the nut 33. Further movement of the nut body 35 into the recess 14 forces the collet into the conical bore 6 of the adapter 4, thereby compressing the collet and contracting the cylindrical bore 18 thereof into gripping engagement with the tool shank 21 therein.

An abutment 40 providing a position determining surface 40a is secured to the inner wall 9 of the spindle bore 3 in axial alignment with the bore 3, by an integral stud 42 which is pressed into an opening 43 in the spindle 1. The bores 6 and 8 and the rear of bore 3 form an opening within which the collet 16 and the shank 21 with positioning pin housing 24 are received.

A retainer snap ring 45 may be disposed about the collet 16 between the inner face of the collar 19 thereof and the outer end of the adapter 4.

In mounting a tool in the spindle 1 the nut 33 is first retracted in the recess 14 a distance sufficient for the spring ring 45 to force the collet 16 outwardly in the conical bore 6 of the adapter 4 until it fully expands. The tool shank 21 is then manually inserted into and through the cylindrical bore 18 of the collet 16 until the reduced extension 22 thereof is disposed in the aperture 8 in the end wall 7 of the adapter 4 and the positioning surface 29a on the spring pressed pin 29, which extends out from the housing 24, engages the positioning surface 40a of abutment 40. The strength of the spring 31 is such that the pin 29 will not be forced into the housing 24 against the outward pressure thereof by any normal manual force exerted when inserting the shank 21 into the collet 16. The nut 33 is then screwed into the recess 14 thereby forcing the collet 16 into the conical bore 6 of the adapter until it is contracted and grips the shank 21, after which during further movement of the collet 16 into the bore 6 by the nut 33, the shank 21 will be carried along with the collet until the pin 29 is forced into the housing 24 against the pressure of the spring 31 and the positioning surface 27a of the housing 24 engages the positioning surface 40a of abutment 40 mounted on bordering wall 9 and stops any further inward movement of the shank. The shank 21 of a work tool can thereby always be accurately positioned and clamped in a predetermined position within a machine tool spindle. The distance a tool shank will be carried along with the collet 16, and consequently the position of the shank within a spindle may be varied as desired by adjusting the pin housing 24 back and forth within the threaded bore and clamping it in adjusted position by the lock nut 25 but usually amounts to several thousandths of an inch.

To remove a work tool from the holder the nut 33 is screwed outwardly in the recess 14 a sufficient distance for the ring 45 to force the collet 16 outwardly in the conical bore 6 of the adapter 4 until it springs back to normal condition and releases its grip on the tool shank 21, after which the compression spring 31 projects the pin 29 back outwardly, to the limit of its movement, from the housing 24 thereby forcing the shank 21 slightly outwardly in the collet 16. The tool can then be manually removed from the holder.

From the foregoing it will be apparent to those skilled in this art that I have provided a very simple and effective mechanism for accomplishing the objects of the invention.

It is to be understood that I am not limited to the specific construction shown and described herein as various modifications may be made therein within the spirit of the invention and the scope of the appended claims.

What is claimed is:

1. In a tool holder assembly: holder means adapted to be revolved and having an opening including an axially tapering bore in the outer free end of the holder means; cooperatively tapering split tubular collet means received in said bore in tool receiving operative position with freedom for inward movement relative to said bore; a tool supporting shank received in said collet means; adjusting nut means mounted by said holder means and operable to relatively move said collet means and holder means axially to compress said collet means and tighten it down radially on said shank; said opening having an axially fixed abutment surface therein; and positioning means mounted on the inner end of said shank having an axially yieldable part for engaging said abutment surface when the shank is initially inserted into said collet means and an axially nonyieldable part, spaced a predetermined distance axially outward of said yieldable part when the yieldable part is in one position, for engaging the abutment surface and finally positively positioning the shank when the collet means is clamped down on the shank and carries the shank axially inwardly with it during the terminal portion of the clamping down operation.

2. The combination defined in claim 1 in which said nonyieldable part comprises a pin housing on said shank and the yieldable part comprises a pin projecting axially a predetermined distance therefrom; and compressible spring means is provided between said pin and housing to normally urge said pin to projected position.

3. The combination defined in claim 2 in which the holder means includes a liner sleeve with an axially tapered bore and a spindle part with a blind bore within which said liner is received; the liner having an end wall spaced axially from the end wall of the blind bore and there being a polygonal opening through said liner end wall; the shank has a corresponding polygonal inner end received in said opening; an abutment on the end wall of said blind bore; and said pin housing comprises a threaded stud adjustably received in said shank.

4. In a holder assembly: holder means having an opening in an outer end thereof; collet means operatively mounted in said holder means for inward axial movement therein; a shank to be held received by said collet means; the holder means and collet means being cooperatively configured so that relative axial movement thereof clamps the collet means down on the shank; means for moving said collet means and holder means relatively axially to clamp the collet means down on the shank; and positioning means, including a surface mounted for abutting engagement with the holder means which is operative to yieldingly resist inward movement of said shank when it is inserted into the holder means a predetermined distance, operative to positively stop the shank after the shank has been moved a predetermined distance further inwardly in the holder means by tightening down of said collet means.

5. The combination defined in claim 4 in which said positioning means is mounted on said shank and includes said surface and another surface normally axially spaced therefrom; and spring means normally maintaining the spacing but compressible to permit said surfaces to axially align so that positive positioning occurs.

6. The combination defined in claim 4 in which said positioning means includes axially compressible means and said surface is provided thereon.

References Cited

UNITED STATES PATENTS

| | | | |
|---|---|---|---|
| 2,415,482 | 2/1947 | Greenough | 279—1 |
| 3,052,999 | 9/1962 | Sedgwick | 279—1 |

ROBERT C. RIORDON, *Primary Examiner.*

E. A. CARPENTER, *Assistant Examiner.*